United States Patent [19]
Dräxlmaier, Jr.

[11] Patent Number: 5,382,398
[45] Date of Patent: Jan. 17, 1995

[54] METHOD OF FABRICATING AN INTERIOR FURNISHING PART WITH DECORATIVE OR ATTACHMENT SEAM

[75] Inventor: Fritz Dräxlmaier, Jr., Geisenhausen, Germany

[73] Assignee: Eldra-Kunststofftechnik GmbH, Vilsbiburg, Germany

[21] Appl. No.: 165,559

[22] Filed: Dec. 9, 1993

Related U.S. Application Data

[63] Continuation of Ser. No. 706,581, May 28, 1991, abandoned.

[30] Foreign Application Priority Data

May 28, 1990 [DE] Germany .............. 4017173

[51] Int. Cl.6 .............................................. B29C 67/22
[52] U.S. Cl. .................... 264/46.5; 264/46.8; 264/293; 156/93; 112/265.1
[58] Field of Search .................. 112/265.1; 156/93; 264/46.7, 46.8, 46.5, 511, 267, 293

[56] References Cited

U.S. PATENT DOCUMENTS

| | | | |
|---|---|---|---|
| 3,675,289 | 7/1972 | Mark | 29/91 |
| 3,971,112 | 7/1976 | Amato et al. | 156/93 |
| 4,684,419 | 7/1987 | Agosta | 156/93 |
| 4,708,760 | 11/1987 | Mark et al. | 156/93 |
| 4,861,543 | 8/1989 | Rafferty | 264/46.8 |
| 4,875,843 | 10/1989 | Onnenberg et al. | 264/46.5 |
| 5,037,591 | 8/1991 | Rohrlach et al. | 264/46.5 |

FOREIGN PATENT DOCUMENTS

| | | | |
|---|---|---|---|
| 3704528 | 2/1988 | Germany | 264/46.8 |
| 2193462 | 2/1988 | United Kingdom | 264/46.8 |

*Primary Examiner*—Allan R. Kuhns
*Attorney, Agent, or Firm*—Anderson Kill Olick & Oshinsky

[57] ABSTRACT

An interior furnishing part for use in motor vehicles has a covering material sheet forming the exterior or facing surface of the furnishing part backed by a support part with a padding material between the covering material and the support part. Initially, the material sheet is unshaped and is shaped in a mold. During molding, the material sheet is provided with a recess or rib in the exterior or facing surface. After the molding operation, a decorative or attachment seam is sewn in the exterior surface of the furnishing part with the sewing machine guided by the recess or rib. The seam extends at least partly through the interior furnishing part. A foamable material can be used as the padding material.

12 Claims, 3 Drawing Sheets

METHOD OF FABRICATING AN INTERIOR FURNISHING PART WITH DECORATIVE OR ATTACHMENT SEAM

This is a continuation of application Ser. No. 07/706,581, filed May 28, 1991, now abandoned.

BACKGROUND OF THE INVENTION

An interior furnishing part for use in motor vehicles is provided in its method of fabrication with a decorative or attachment seam.

The invention is directed to a method of manufacturing interior furnishing parts for motor vehicles with the parts being provided with a decorative or attachment seam. The furnishing part has a material sheet formed into its intended final shape in a molding operation using a male or female mold. The material sheet forms the exterior or outside surface of the part and is backed by a support part or material with the possibility of inserting padding between the outside material sheet and the support material. The padding can be a foamed material. After the molding step, the furnishing part is provided with a decorative or attachment seam.

Interior furnishing parts for vehicles, such as foam-backed interior linings, dashboards, and upholstery parts, are usually manufactured in a female mold containing a molding cavity. Initially, a cover sheet forming the visible exterior of the interior furnishing part is inserted into the mold and a support is placed on it and finally, after the mold is closed, the covering material is connected or bonded to the support part by foaming a foamable material introduced between the two parts, so that the interior furnishing part is provided with its intended final shape. With such a process it is possible to manufacture large area interior furnishing parts with a three-dimensional curved surface when utilizing single or multiple part covering material blanks and providing a padding or foam backing material of variable thickness.

The formation of ornamental or decorative seams prior to the molding step on an interior furnishing part is complicated by the fact that an adequate centering of the mold is not possible in a simple manner, so that a straight line run of the seam parallel to a groove in the mold is not assured and can not be effected in mass production. It is known in the fabrication of foam backed upholstery parts, such as in DE-PS 37 43 318, to fix or attach a cover, formed of individual portions of a covering material connected to one another by seams, at protruding ribs of a deep drawing mold for assuring a correct run of the seams on the finished part. Such a process, however, requires a considerable expenditure of time in preparing the mold and of the use of the machinery, since the fixation of the seams in the mold at its ribs requires the use of a gripper arrangement having a complicated structure. If the covering material is leather or a natural or synthetic material, it is also necessary in the known method to seal the seam before backing it with foam, to prevent the foamed material from penetrating through the needle holes. Accordingly, this known method is too expensive and inaccurate for locating purely decorative or ornamental seams.

SUMMARY OF THE INVENTION

Therefore, based on this known state of the art, it is the primary object of the present invention to provide a method of fabricating interior furnishing parts with a decorative or attachment seam with the least possible use of machinery and the least possible expenditure of processing time. The interior furnishing parts, starting with an unshaped material sheet, are placed into the intended final shape by a male or female mode with the visible exterior surface formed by the covering material possibly backed by padding or foamed material and provided with a decorative or attachment seam. Furthermore, it is a primary object of the present invention to form interior furnishing parts for vehicles which can be produced in a simple manner and provided with a decorative or attachment seam.

In accordance with the present invention, the decorative or attachment seam is formed in the interior furnishing part after the part has been fabricated, that is, at least the covering material sheet, the foam backing and the support part have been completely formed. For ease in the formation of the decorative or attachment seam along an accurate line, in the course of the molding step of the interior furnishing part a line shaped deformation corresponding to the intended line of the decorative or attachment seam is formed on the visible exterior surface of the covering material and the line shaped deformation is subsequently used as a guide for the presser foot of a sewing machine used for forming the seam.

The method of the present invention permits the formation of a guide for the sewing machine or its presser foot as required for producing a decorative or attachment seam precisely along a predetermined line, with the step of molding the interior furnishing part affording the guidance line without any additional machinery or the expenditure of time for producing the intended decorative attachment seam utilizing a sewing machine as a penetrating seam in the completely molded and possibly curved three dimensionally shaped interior furnishing part in a random fashion and with effective guidance orientation. Accordingly, the fabrication costs of the interior furnishing part with a decorative or attachment seam is reduced as compared with other processes, especially for internal furnishing parts where the visible exterior surface of the covering material is a skin or leather, since it is possible to eliminate any special sealing measures for the seam. Moreover, a decorative seam attached in a continuous manner assures at the same time an improvement in strength.

The molded deformation affording the guide for the sewing machine during the subsequent formation of the decorative or attachment seam on the visible exterior surface of the covering material can be shaped as a protruding web or rib or as a recessed groove depending on the intended visual effect or other circumstances.

In one embodiment of the method where the guidance for the sewing machine is provided by a groove shaped recess in the exterior surface of the covering material, the rectilinear groove-shaped recess is produced by a rectilinear ridge or rib formed in the molding surface of the mold, whereby advantageously the molding rib has essentially a rectangular cross-section and the covering material is urged by a vacuum, applied on both sides of the molding rib, against the shaping surface of the mold.

For the formation of a groove-shaped recess in the exterior surface of the covering or upholstery material, it can be provided that the shaping rib has essentially a rectangular cross section and the covering material is drawn to the molding surface of the mold on both sides of the molding rib by double-sided bonding strips or bonding lacquer.

The method of the present invention is not limited to the use of a molding rib having a rectangular cross-section, rather the molding rib can have other cross-sectional shapes depending on the intended use of the part in an individual case.

If the molded shape, forming the guidance for the sewing machine during the subsequent formation of the decorative or attachment seam on the exterior surface of the covering material, is shaped as a protruding rib, a groove or recess in the molding surface of the mold can be used along with a vacuum source for providing the desired shape.

The method of the present invention is especially suited for the production of interior furnishing parts provided with a decorative or attachment seam made up of a covering material, a support part and possibly a foamable material inserted between the covering material and the support part with the internal furnishing part being produced in a female mold. In place of the foamable material, a padding material can be used.

Further, the method of the present invention can also be utilized for producing padded parts of the vehicle interior furnishing containing decorative or attachment seams, for instance, parts of vehicles seats where a tape-shaped abutment element for the decorative or attachment seam is introduced into the foamed backing of the covering material.

In an interior furnishing part produced in the above described manner, the covering material forming its visible surface is connected with a support by bonding and a foamable material is located only in certain areas. Such a furnishing part has a rectilinearly extending molded part in its visible exterior surface for guiding the formation of at least one continuous decorative or attachment seam extending parallel to the molded part, with the seam formed subsequently continuously along its entire length and possibly formed as a double seam.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
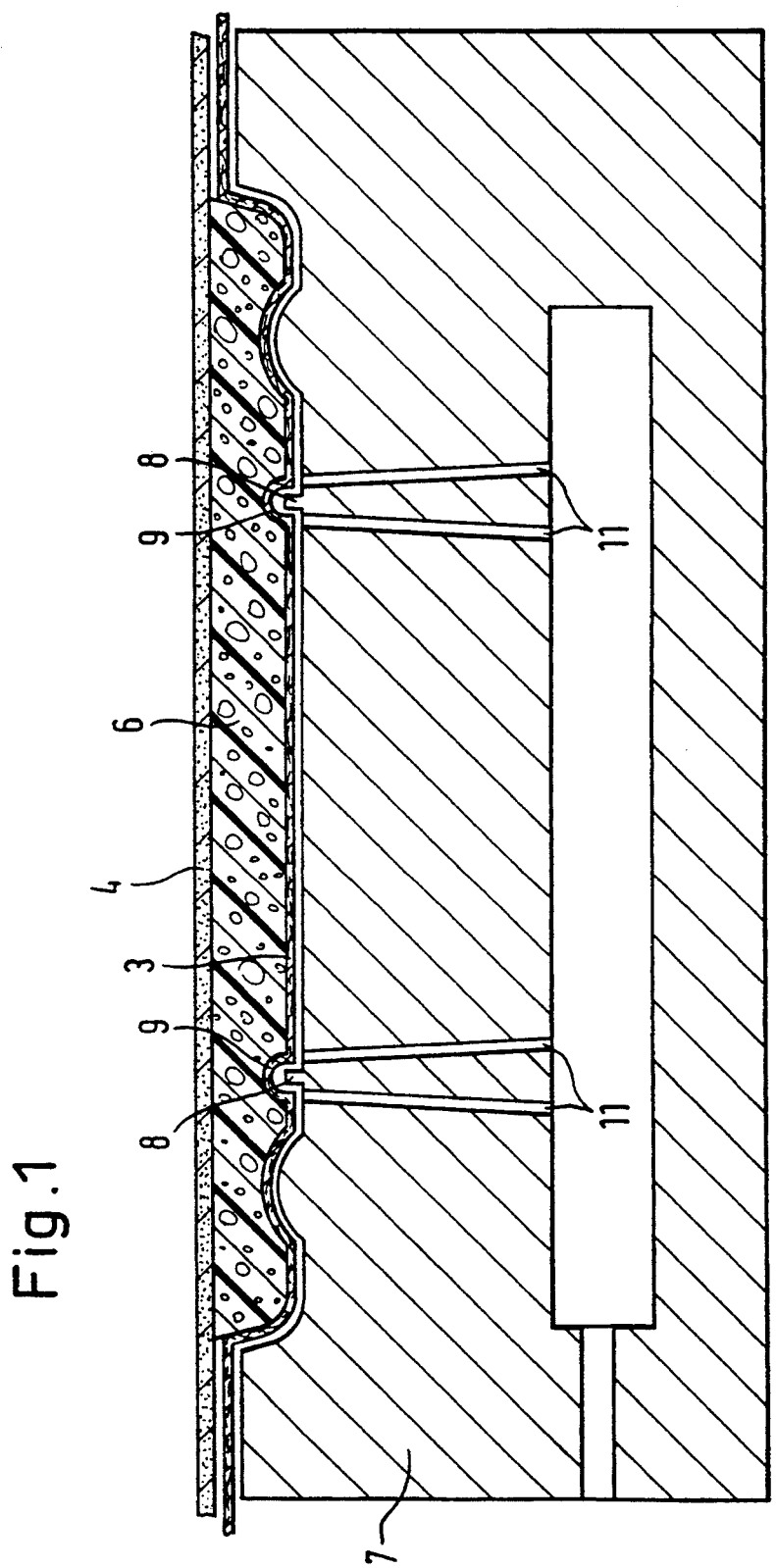
FIG. 1 is a partial sectional view of a mold for fabricating an interior furnishing part in accordance with the present invention.
Figure 2:
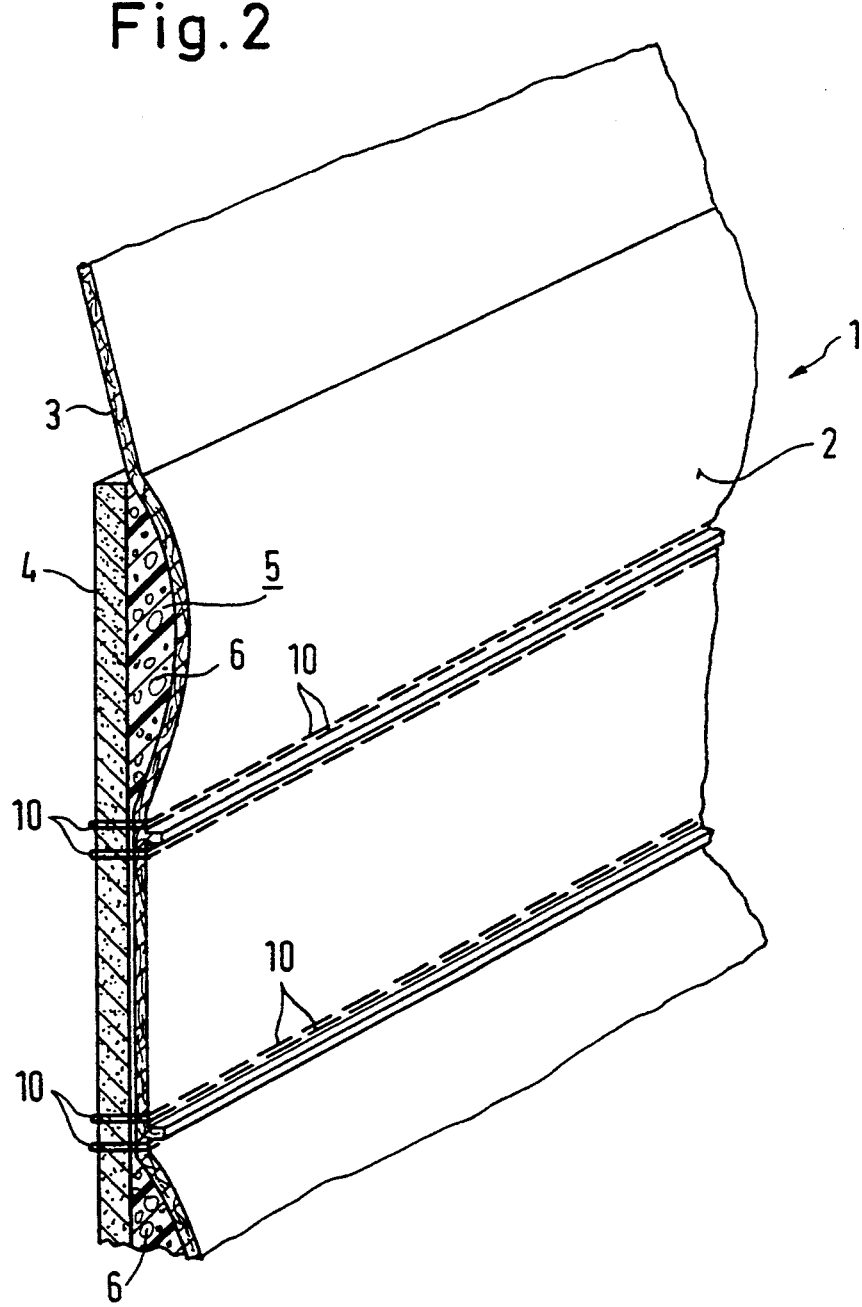
FIG. 2 is a partial perspective view, partly in section, of an interior furnishing part provided with a decorative or ornamental attachment in accordance with the present invention.

In FIG. 1 a cavity or a female mold 7 is illustrated for fabricating an interior furnishing part for use in a motor vehicle or the like. The furnishing part has a sheet of covering material 3 which forms the visible exterior surface 2 of the furnishing part. The furnishing part 1 includes a support part 4 forming the rear surface of the part with a foamable material 6 introduced between the covering material and the support part and forming a padding for at least a portion of the furnishing part. Initially, the covering material is inserted into the female part and in the molding operation conforms to the shape of the molding surface of the female mold 7. Female mold 7 has a molding rib or strip 8 with a rectangular cross-section, so that a similarly configured groove-shaped depression or recess 9 is formed in the visible exterior surface 2 of the covering material as the interior furnishing part 1 is molded. After the molding process, the recess 9 is used as a guide for a sewing machine during the production of the decorative or attachment seam 10, note FIG. 2. To achieve the accurate formation of the grooved shaped recess 9, the covering material 3 is drawn on both sides of the molding rib 9 against the molding surface of the female mold 7, and for this purpose the mold 7 has vacuum channels 11 opening through it to the molding surface and extending along both sides of the molding rib 8. After the covering material has been accurately placed in the female mode 7 the covering material is connected with the support part 4 by a foaming operation. After the completion of the molding and foaming steps of the interior furnishing part 1, the decorative or attachment seam is formed as a continuous seam by a sewing machine, possibly as a double seam as shown in FIG. 2, using the rectilinearly extending recess 9 as a guide. Note in FIG. 2 that the padding 5, 6 is located only between selected areas of the covering material 3 and the support part 4.

Figure 3:
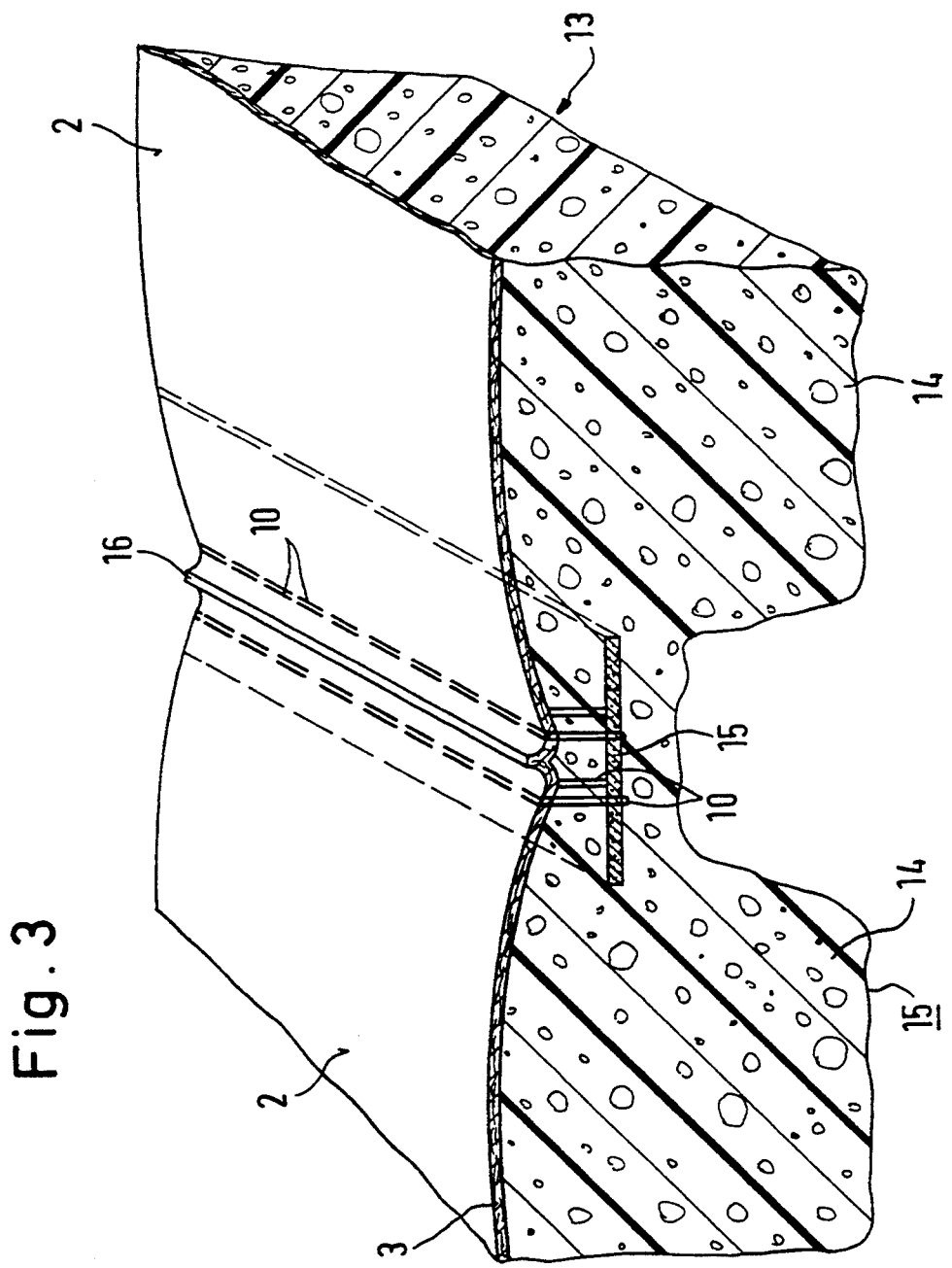
FIG. 3 is a partial perspective view of another padded interior furnishing part in accordance with the present invention.

In the fabrication of a padded part 13 as displayed in the FIG. 3, initially a sheet of covering material is placed in the female mold and due a rectilinear recess in its molding surface, not shown, the covering material is provided with a rectilinear rib 16 followed inwardly by a foam backing 14. Within the foam backing 14 is a tape or strip shaped abutment 15 formed of a fabric material. After completing the molding and foaming of the padded part 13, a decorative or attachment double seam 10 is provided along the opposite sides of the rib 16. The seams are formed by a suitable sewing machine using the rib 16 as a guide for a sewing machine or its presser foot, not shown.

While specific embodiments of the invention have been shown and described in detail to illustrate the application of the inventive principles, it will be understood that the invention may be embodied otherwise without departing from such principles.

I claim:

1. A method of fabrication of interior furnishing parts for motor vehicles and having a decorative or fastening seam, said method comprising the steps of:

providing a mold having a molding surface corresponding to a predetermined profile of an exterior surface of an interior furnishing part;

placing a sheet of profiled covering material into the mold for obtaining the predetermined profile of the exterior surface of the furnishing part, the mold having means provided on the molding surface thereof that forms a rectilinearly extending deformation on an exterior surface of the covering material;

placing a carrier element of the furnishing part at least partially in a spaced relationship relative to the profiled covering material;

filling the space between the carrier element and the profiled covering material with a foamable material and molding the carrier element and the profiled covering material together by foaming the foamable material; and thereafter, sewing the decorative or fastening seam with a sewing machine using the rectilinearly extending deformation on the exterior surface of the covering material as a guide for a presser foot of the sewing machine, with the seam penetrating and passing through the finished molded interior furnishing part.

2. Method, as set forth in claim 1, wherein the decorative or attachment seam is sewn as a continuous seam extending through the interior furnishing part.

3. Method, as set forth in claim 1, wherein the attachment seam is sewn by passing through the covering material and at least a portion of the padding material using a single thread sewing machine.

4. Method, as set forth in claim 1, wherein the decorative or attachment seam is formed as a double seam.

5. Method, as set forth in claim 1, wherein the deformation in the exterior surface of the covering material is formed as a recess formed by a molding rib projecting outwardly from the molding surface of the mold.

6. Method, as set forth in claim 1, wherein the deformation is a rectilinear rib formed by a rectilinear recess provided in the molding surface of the mold.

7. Method, as set forth in claim 5, wherein a vacuum is used on the exterior surface of the covering material for drawing the covering material into contact with the molding rib.

8. Method, as set forth in claim 6, wherein a vacuum is used on the exterior surface of the covering material for drawing the covering material into contact with the molding recess.

9. Method, as set forth in claim 5, wherein the molding rib has a rectangular cross-section and a vacuum is applied to the covering material along the opposite sides of the molding rib for drawing the exterior surface into contact with the rib.

10. Method, as set forth in claim 5, wherein the molding rib is provided with a rectangular cross-section, and the covering material is fastened to the molding surface of the mold on both sides of the molding rib by one side of two sided adhesive strips and adhesive lacquer.

11. Method, as set forth in claim 1, wherein a female mold is used to receive a foamable material between the covering material and the support part as the padding.

12. Method, as set forth in claim 11, wherein a strip shaped backup part is located in the padding spaced between and from the covering material and the support part as a backup element for the decorative or attachment seam.

* * * * *